W. E. LAWRENCE.

CURRY-COMB.

No. 7,238.

Reissued July 25, 1876.

Attest:

Courtney A. Cooper.

E. M. Spence

Wm E. Lawrence

By his atty

Charles E. Foster

N. PETERS, PHOTO-LITHOGRAPHER, WASHINGTON, D. C.

UNITED STATES PATENT OFFICE.

WILLIAM E. LAWRENCE, OF NEW YORK, N. Y., ASSIGNOR TO THE LAWRENCE CURRY-COMB COMPANY, OF SAME PLACE.

IMPROVEMENT IN CURRY-COMBS.

Specification forming part of Letters Patent No. 150,585, dated May 5, 1874; reissue No. 6,605, dated August 24, 1875; reissue No. 7,238, dated July 25, 1876; application filed July 10, 1876.

*To all whom it may concern:*

Be it known that I, WILLIAM E. LAWRENCE, of the city, county, and State of New York, have invented an Improvement in Curry-Combs, of which the following is a specification:

The object of this invention is a curry-comb in which the tooth-plates are strengthened and connected together and to the handle, and a supplementary central grasp above the back is provided, as fully described hereafter.

Figure 1:
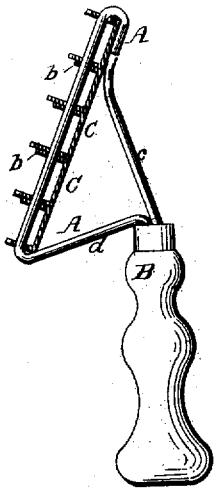
Figure 2:
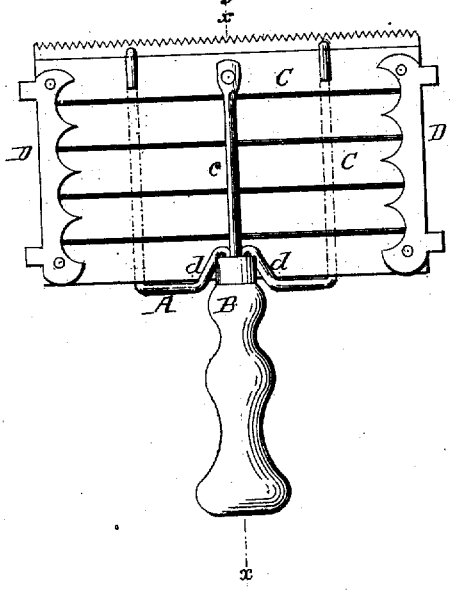
Figure 4:
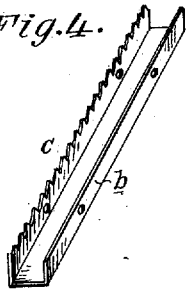
Figure 3:
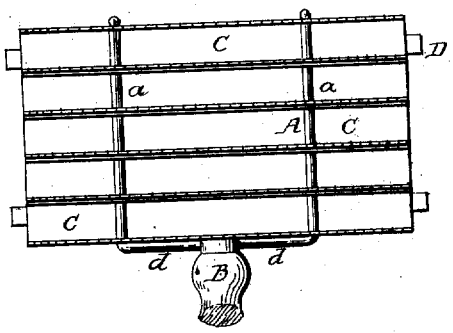

In the drawing, Figure 1 represents a vertical section on the line *x x*, Fig. 2. Fig. 2 is a back view of the same. Fig. 3 is a face view, and Fig. 4 is a perspective view, of one of the comb-bars detached.

A is a frame, which is, by preference, made of wire, the portions *a a* supporting and connecting a series of U-shaped comb-bars, C, (see Figs. 1 and 4,) each comb-bar being provided with the usual toothed plate or flange, and with a narrower plate or flange, *b*, which, when said bars are in position, bears against the adjacent bar and tends to stiffen the same. The bars C are, by preference, stamped up of sheet metal, and when the same are secured in the frame A they produce a closed-back comb, as shown in Fig. 2. The rods *a* pass through holes in the flanges, as seen in Fig. 1, and are secured by bending their ends over, as shown in Figs. 1 and 2, or by any other suitable means. The handle is connected to the comb by rods or braces *d d*, which either form part of the frame A, or may be made separate from the comb, and connected to it in any desirable manner and over the back of the comb. On the same vertical plane or line *x x* as the side handle, extends a bar, *c*, which serves to brace the handle, and constitutes a support for the hand and a supplementary central grasp at the back of the comb. D D are knockers, which are cast separately, and are riveted to the backs of the bars C, as shown in Fig. 2.

I claim—

1. The curry-comb, containing toothed plates and contiguous plates without teeth to strengthen the toothed plates, substantially as specified.

2. A comb bar or plate for a curry-comb, made in a trough shape, with teeth upon the wider flange *a*, and the other flange *b* plain, substantially as specified.

3. The combination, in a curry-comb, of a series of U-shaped comb-bars and rods passing through the flanges of the comb-bars, and connecting the latter to each other and to the handle, substantially as set forth.

4. A curry-comb, provided with a handle, B, and with a central grasp and support for the hand above the back of the comb, and in a line with said handle, substantially as set forth.

5. A curry-comb in which the handle is braced by a bar extending from the end of the handle to the front portion of the comb, substantially as set forth.

In testimony whereof I have signed my name to this specification in the presence of two subscribing witnesses.

WM. E. LAWRENCE.

Witnesses:

C. E. L. HOLMES,
F. D. BAKER.